(12) United States Patent
Michishige et al.

(10) Patent No.: US 7,259,653 B2
(45) Date of Patent: Aug. 21, 2007

(54) KEYLESS ENTRY DEVICE (75) Inventors: Tatsuya Michishige, Tokyo (JP);
Yoshinori Amagasa, Tokyo (JP)

(73) Assignee: Fuji Jukogyo Kabushiki Kaisha (JP)

( * ) Notice: Subject to any disclaimer, the term of this patent is extended or adjusted under 35 U.S.C. 154(b) by 285 days.

(21) Appl. No.: 10/977,326

(22) Filed: Oct. 29, 2004

(65) Prior Publication Data
US 2005/0162254 A1 Jul. 28, 2005

(30) Foreign Application Priority Data
Nov. 6, 2003 (JP) ............................. 2003-376622
Nov. 6, 2003 (JP) ............................. 2003-376626

(51) Int. Cl.
*H04Q 9/00* (2006.01)
*H01H 27/00* (2006.01)
(52) U.S. Cl. ................... 340/5.61; 340/5.71; 340/5.23; 307/10.4; 307/10.5
(58) Field of Classification Search ............... 340/5.61, 340/5.71, 5.23; 307/10.4, 10.5
See application file for complete search history.

(56) References Cited

U.S. PATENT DOCUMENTS

| | | | | |
|---|---|---|---|---|
| 4,347,545 A | * | 8/1982 | Weishaupt et al. | 307/10.5 |
| 4,754,255 A | * | 6/1988 | Sanders et al. | 340/5.72 |
| 4,931,789 A | * | 6/1990 | Pinnow | 340/5.64 |
| 5,650,774 A | | 7/1997 | Drori | |
| 5,736,935 A | * | 4/1998 | Lambropoulos | 340/5.61 |
| 5,864,297 A | * | 1/1999 | Sollestre et al. | 340/5.72 |
| 5,933,086 A | * | 8/1999 | Tischendorf et al. | 340/5.62 |
| 5,986,542 A | * | 11/1999 | Hyde | 307/10.4 |
| 6,331,812 B1 | * | 12/2001 | Dawalibi | 340/5.2 |
| 6,617,975 B1 | * | 9/2003 | Burgess | 340/815.47 |
| 6,718,240 B1 | * | 4/2004 | Suda et al. | 340/5.72 |
| 2005/0040933 A1 | * | 2/2005 | Huntzicker | 340/5.72 |

* cited by examiner

*Primary Examiner*—Jeffery Hofsass
*Assistant Examiner*—Scott Au
(74) *Attorney, Agent, or Firm*—Smith, Gambrell & Russell, LLP (57) ABSTRACT

A keyless entry device includes: a transmitter which includes an operating section relating to a door lock state for transmitting a door operation information and a specific identifying information based on an operating state of the operating section; and a receiving unit for outputting a signal to a door lock device based on the transmitted door operation information when the specific identifying information transmitted coincides with a registered identifying information stored previously; wherein a plurality of pieces of partial informations obtained by dividing the registered identifying information are sequentially received by the receiving unit to permit the information to be stored in the receiving unit.

20 Claims, 7 Drawing Sheets

KEYLESS ENTRY DEVICE

BACKGROUND OF THE INVENTION

The present invention relates to a keyless entry device comprising a transmitter that transmits a door operation information and a receiving unit that outputs a signal to a door lock device based on the door operation information.

DESCRIPTION OF RELATED ART

As a sort of keyless entry devices, one having a transmitter which has a lock button and an unlock button as an operating section relating to a door lock state and which transmits a door operation information based on an operating state of this operating section, is generally used. A driver brings the transmitter with himself/herself and performs a remote control operation relating to the door lock state from outside of a vehicle.

Further, a receiving unit that receives an information from the transmitter is installed within the vehicle. This receiving unit outputs a signal to the door lock device of the vehicle and performs locking/unlocking of vehicle doors, based on the door operation information.

In order to enhance a security of the vehicle, nowadays, what is known is a device in which an identification code as a specific identifying information is transmitted from a transmitter to a receiving unit and when the transmitted specific identifying information coincides with an identification code as a registered identifying information which is preliminarily stored in the receiving unit, a signal output to a door lock device is permitted (see, for example, U.S. Pat. No. 5,650,774). By using such a device, when the transmitter side and the receiving unit side have a different identification code from each other, it is considered that the door operation information is not transmitted from a valid (or a correct) user of the vehicle, and as the result, unlocking or the like of vehicle doors is not performed.

In this keyless entry device, when the identification code as the registered identifying information is stored in the receiving unit, what is generally used is a method in which the receiving unit is put under a registration mode in some ways and an information such as plural-digit number is at once transmitted as the identification code, from the transmitter.

However, in the keyless entry device, when such a circumstance as receiving at once (or en bloc) the identification codes is abused and another identification code is transmitted by the third person or the like, in a state where the receiving unit is put under a registration mode, the identification code of the third person or the like is registered. More specifically, the device has a problem that by the third person intending the theft, the identification code in the receiving unit can be re-written over with another identification code from another transmitter, and as a result, a sufficient security relating to a door locking cannot be secured. In addition, the device has the trouble that since the registration is performed with a radio wave, when a transmitter for registering an identification code in the receiving unit is not on hand, a registration of the transmitter can not be performed.

SUMMARY OF THE INVENTION

The present invention has been made under the above-described circumstances and an object of the present invention is to provide a keyless entry device capable of improving security so as to prevent a registered identifying information from being written over by the third person intending the theft.

In order to achieve the object, in accordance with a first aspect of the present invention, the keyless entry device comprises: a transmitter which comprises an operating section relating to a door lock state, and transmits a door operation information and a specific identifying information based on an operating state of the operating section; and a receiving unit which outputs a signal to a door lock device based on the door operation information when the specific identifying information coincides with a registered identifying information which is previously stored, wherein a plurality of partial informations obtained by dividing the registered identifying information are sequentially received by the receiving unit to permit the registered identifying information to be stored in the receiving unit.

According to a first aspect of the present invention, when the registered identifying information is stored in the receiving unit, a plurality of divided partial informations are sequentially received by the receiving unit, that is, without permitting the registered identifying information to be collectively received by the receiving unit, whereby the whole registered identifying information is stored in the receiving unit.

Accordingly, even if the registered identifying information is transmitted to the receiving unit by the third person intending the theft, the registered identifying information is not written over because the receiving unit is set so as to sequentially receive the registered identifying information which is in a state of the divided partial information. Therefore, the device is remarkably improved in security in comparison with a conventional one in which a registration of the identifying information is performed with the transmitter, without a special protective function provided.

Preferably, each of the specific identifying information and the registered identifying information includes a number information relating to the number comprising a plurality of digits, and the partial information is the number comprising at least one digit in the number information.

According to the device, the specific identifying information and the registered identifying information include the number information and therefore, not only is a management of the information conveniently performed, but also the partial information can be easily generated by dividing a plural-digit number into a predetermined digit number.

Preferably, the device further comprises a reporting section that reports that a reception of the partial information by the receiving unit is completed, with respect to each of the plurality of the partial informations.

According to the device, whenever a reception of the partial information in the receiving unit is completed, a reporting section reports to a registration operator that the reception is completed. Accordingly, the registration operator can recognize whether an input of the next partial information may be performed because the input of the partial information is completed with no problem, or the input must be re-performed because the input of the partial information is not completed due to, for example, a communication failure or an inputting error.

Preferably, the device further comprises a displaying section that displays the number information when the registered identifying information is stored in the receiving unit.

According to the device, when the registered identifying information is stored, a registration operator can perform a registration operation while having the number information of the registered identifying information in his/her sights with a displaying section. Therefore, a burden on the registration operator can be reduced, and a correct registered identifying information can be accurately registered.

Preferably, by operating an operating switch on the transmitter with respect to each digit of the number information, the registered identifying information to be stored in the receiving unit is decided.

According to the device, when the operating switch of the transmitter is operated as many times as the number of the digits of the registered identifying information, all the figures of each digit in the registered identifying information are fixed and thereby, the number information of the registered identifying information is decided. By doing so, the registration operation requires complicated processing and as a result, it becomes difficult to readily write over the registered identifying information of the receiving unit. Accordingly, writing over of the registered identifying information by the third person intending the theft can be more securely prevented.

Preferably, the transmitter holds the registered identifying information and determines whether the partial information inputted from the operating switch coincides with the partial information of the registered identifying information held by the transmitter.

According to the device, the transmitter determines whether the partial information inputted by an operation of the operating switch coincides with the partial information of the registered identifying information held by the transmitter and therefore, when the operator inputs the partial information, the transmitter compares the inputted information with the partial information of the registered identifying information held by the transmitter, and can notify the operator of the results, for example, by lighting or blinking an indicator on the transmitter, or by blowing a buzzer. Accordingly, the operator can perform the registration operation, for example, while confirming a display of the indicator on the transmitter.

Preferably, the operating switch uses a button system and a figure of each digit of the number information is decided on the basis of the number of times of pressing (or pushing) the operating switch.

According to the device, the figure of each digit is decided by the number of the times of pressing the operating switch and therefore, a complicated registration operation is not required and as a result, the registration operator can perform the registration without having trouble with an input operation.

Preferably, the operating switch uses a button system and the figure of each digit of the number information is decided on the basis of a time period of holding on the operating switch.

According to the device, the figure of each digit is decided according to the time period of holding on the operating switch and therefore, the complicated registration operation is not required and as the result, the registration operator can perform the registration without having the trouble with the input operation. More preferably, the device is so structured that the registration operator is notified of the figure to be decided, for example, by blinking a lamp or by intermittently blowing the buzzer, depending on the time period of holding on the operating switch.

Preferably, the operating switch comprises a figure changing button for changing the figure of each digit and a figure deciding button for deciding the figure of each digit.

According to the device, for example, any one of a lock button and an unlock button is used as the figure changing button and the other is used as a figure deciding button, whereby respective buttons provided on the transmitter can be effectively used. In addition, since the input operation of the number information is relatively simple, a burden on the registration operator can be further reduced.

Preferably, the receiving unit is so structured that storing the registered identifying information is permitted when a predetermined registration permission signal is received.

According to the device, until a predetermined registration permission signal is received, the registered identifying information cannot be stored. Accordingly, by transmitting this registration permission signal, for example, with a special operation of the vehicle using an immobilizer apparatus, or with an input of a specific password of the vehicle user, the security is further improved.

Preferably, a customized information is stored when the registered identifying information is stored in the receiving unit.

According to the device, the setting of an user customized information such as an answerback function of a door lock, for example, lighting time of a room lamp also can be performed simultaneously with that of the registered identifying information, that is, these settings can be performed at once and therefore, the device is extremely convenient.

As described above, according to the keyless entry device of the first aspect of the present invention, the registered identifying information is not written over by the third person intending the theft. Therefore, the device is remarkably improved in the security in comparison with a conventional one in which the registration of the identifying information is performed with the transmitter, without a special protective function provided.

Further, even if the transmitter for the registration in the receiving unit is not on hand, the registered identifying information can be stored in the receiving unit by receiving thereof to the receiving unit, for example, by another transmitter.

In order to achieve the object, in accordance with a second aspect of the present invention, a keyless entry device comprises: a transmitter which comprises an operating section relating to a door lock state, and transmits a door operation information and a specific identifying information based on an operating state of the operating section; a receiving unit which outputs the signal to a door lock device based on the transmitted door operation information when the specific identifying information transmitted from the transmitter coincides with the registered identifying information which is previously stored; and an operating switch which is installed in the vehicle and is connected to the receiving unit, wherein the registered identifying information is stored in the receiving unit based on an operating state of the operating switch.

According to the device of the second aspect of the present invention, when the registered identifying information is stored in the receiving unit, the operating switch installed in the vehicle is used. More specifically, the registration operator operates the operating switch in the vehicle so that the predetermined registered identifying information is stored in the receiving unit.

Accordingly, the operating switch has to be directly used on the occasion of the registration and therefore, the registered identifying information is not written over by the third person intending the theft. As the result, the device is remarkably improved in the security in comparison with a conventional one in which the registration of the identifying information is performed with the transmitter, without a special protective function provided.

Further, in vehicle plants, vehicle distribution outlets or the like, the registration of the identifying information can be performed without using the transmitter and therefore, the device is extremely convenient. Further, since a person that registers the identifying information can be identified, the device is advantageous also in view of managements of the identifying information.

Preferably, each of the specific identifying information and the registered identifying information includes a number information relating to the number comprising a plurality of digits, and by operating the operating switch with respect to each digit of the number, the registered identifying information to be stored in the receiving unit is decided.

According to the device, when the operating switch is operated as many times as the number of the digits thereof, all the figures of each digit therein are fixed and thereby, the number information thereof is decided. By doing so, the registration operation requires complicated processing and as the result, it becomes difficult to readily write over the identifying information of the receiving unit. Accordingly, writing over of the registered identifying information by the third person intending the theft can be more surely prevented.

Preferably, the operating switch uses a button system and a figure of each digit of the number information is decided on the basis of the number of times of pressing the operating switch.

According to the device, the figure of each digit is decided by the number of times of pressing the operating switch and therefore, a complicated registration operation is not required and as the result, the registration operator can perform the registration without having trouble with an input operation.

Preferably, the operating switch uses the button system and the figure of each digit of the number information is decided on the basis of the time period of holding on the operating switch.

According to the device, the figure of each digit is decided according to the time period of holding on the operating switch and therefore, the complicated registration operation is not required and as the result, the registration operator can perform the registration without having trouble with the input operation. More preferably, the device is so structure that the registration operator is notified of the figures to be decided, for example, by blinking a lamp or by intermittently blowing a buzzer, depending on the time period of holding on the operating switch.

Preferably, the operating switch comprises a digital figure designating switch which designates the figure of each digit of the number information and the digital figure deciding switch which decides the figure designated by the digital figure designating switch.

According to the device, the figure of each digit is decided by the operation of designating the figure of each digit with the digital figure designating switch and by the operation apart from this operation, namely, the digital separating operation with a digital figure deciding switch, therefore, the complicated registration operation is not required and as the result, the registration operator can perform the registration more easily without having trouble with the input operation.

Preferably, the registered identifying information is stored in the receiving unit based on the operating state of the operating switch and based on the registered identification signal transmitted from the failure diagnosing device which is provided independently from the vehicle and the diagnosis failures of the receiving unit.

According to the device, the registered identifying operation by the operating switch is made possible and in addition, the registered identifying information can be stored in the receiving unit also from the failure diagnosing device which is provided independently from the vehicle. In other words, in vehicle plants, vehicle distribution outlets and the like, when the failure diagnosing device is connected to a vehicle, the registered identifying information can be stored with this failure diagnosing device and therefore, the device is extremely advantageous in practical use.

In accordance with a third aspect of the present invention, the keyless entry device comprises: a transmitter which comprises an operating section relating to a door lock state and transmits a door operation information and a specific identifying information based on the operating state of the operating section; and a receiving unit which outputs the signal to the door lock device based on the transmitted door operation information when the specific registered identifying information transmitted from the transmitter coincides with the registered identifying information which is previously stored, wherein the registered identifying information is stored in the receiving unit based on a registered identification signal transmitted from the failure diagnosing device which is provided independently from the vehicle and diagnoses the failure of the receiving unit.

According to the device of the third aspect of the present invention, the registered identifying information can be stored in the receiving unit from the failure diagnosing device which is provided independently from the vehicle. More specifically, the in vehicle plants, the vehicle distribution outlets or the like, when the failure diagnosing device is connected to the vehicle, the registered identifying information can be stored with this failure diagnosing device.

Accordingly, the failure diagnosing device has to be used on the occasion of the registration and therefore, the registered identifying information is not written over by the third person intending the theft. As the result, the device is remarkably improved in the security in comparison with the conventional one in which the registration of the identifying information is performed with the transmitter, without a special protective function provided.

Further, in the vehicle plants, the vehicle distribution outlets or the like, the registration of the identifying information can be performed without using the transmitter and therefore, the device is extremely convenient. Further, since a person who registers the identifying information can be identified, the device is advantageous also in view of managements of the identifying information.

Preferably, the receiving unit is so structured that when a predetermined registration permission signal is inputted, storing the registered identifying information is permitted.

According to the device, until a predetermined registration permission signal is inputted, the registered identifying information cannot be stored. Therefore, this registration permission signal is inputted, for example, by a special operation of the vehicle using an immobilizer apparatus, or by a specific password of the vehicle user, whereby the security is further improved.

Preferably, comprising a displaying section which displays the number information when the registered identifying information is stored in the receiving unit.

According to the device, when the registered identifying information is stored, the registration operator can perform the registration operation while having the number information of the registered identifying information in his/her sights with a displaying section. Therefore, the burden on the registration operator can be reduced, and correct registered identifying informations can be accurately registered.

Preferably, when the registered identifying information is stored in the receiving unit, a customized information is stored along with the registered identifying information.

According to the device, the setting of such a user customized information as an answerback function of the door lock, for example, a lighting time of a room lamp also can be performed simultaneously with that of the registered identifying information, that is, these settings can be performed at once and therefore, the device is extremely convenient.

As described above, according to the keyless entry device according to the second and third aspects of the present invention, the registered identifying information is not written over by the third person intending the theft. Therefore, the device is remarkably improved in security in comparison with a conventional one in which the registration of the identifying information is performed with the transmitter without the special protective function provided.

Further, in the vehicle plants, the vehicle distribution outlets or the like, the registration of the identifying information can be performed without using the transmitter and therefore, the device is extremely convenient. Further, since the person who registers the identifying information can be identified, the device is advantageous also in view of the management of the identifying information.

BRIEF DESCRIPTION OF THE DRAWINGS

The present invention will become more fully understood from detailed descriptions given hereinafter and accompanying drawings given by way of illustration only, and thus are not intended as a definition of limits of the present invention, and wherein.

PREFERRED EMBODIMENTS OF THE INVENTION

Figure 1:
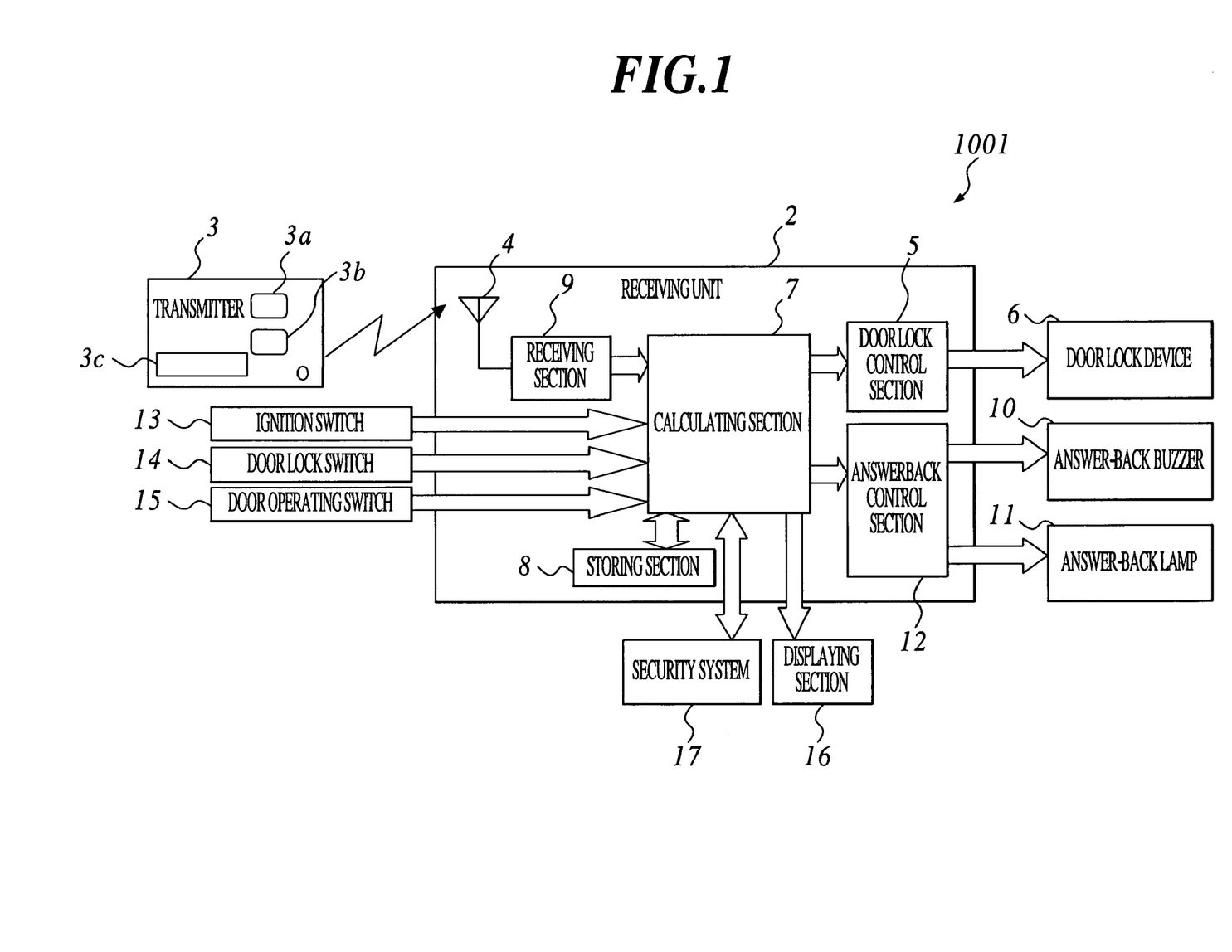
FIG. 1 is a schematic structure block diagram showing a keyless entry device in the first and second embodiments of the present invention.
Figure 2:
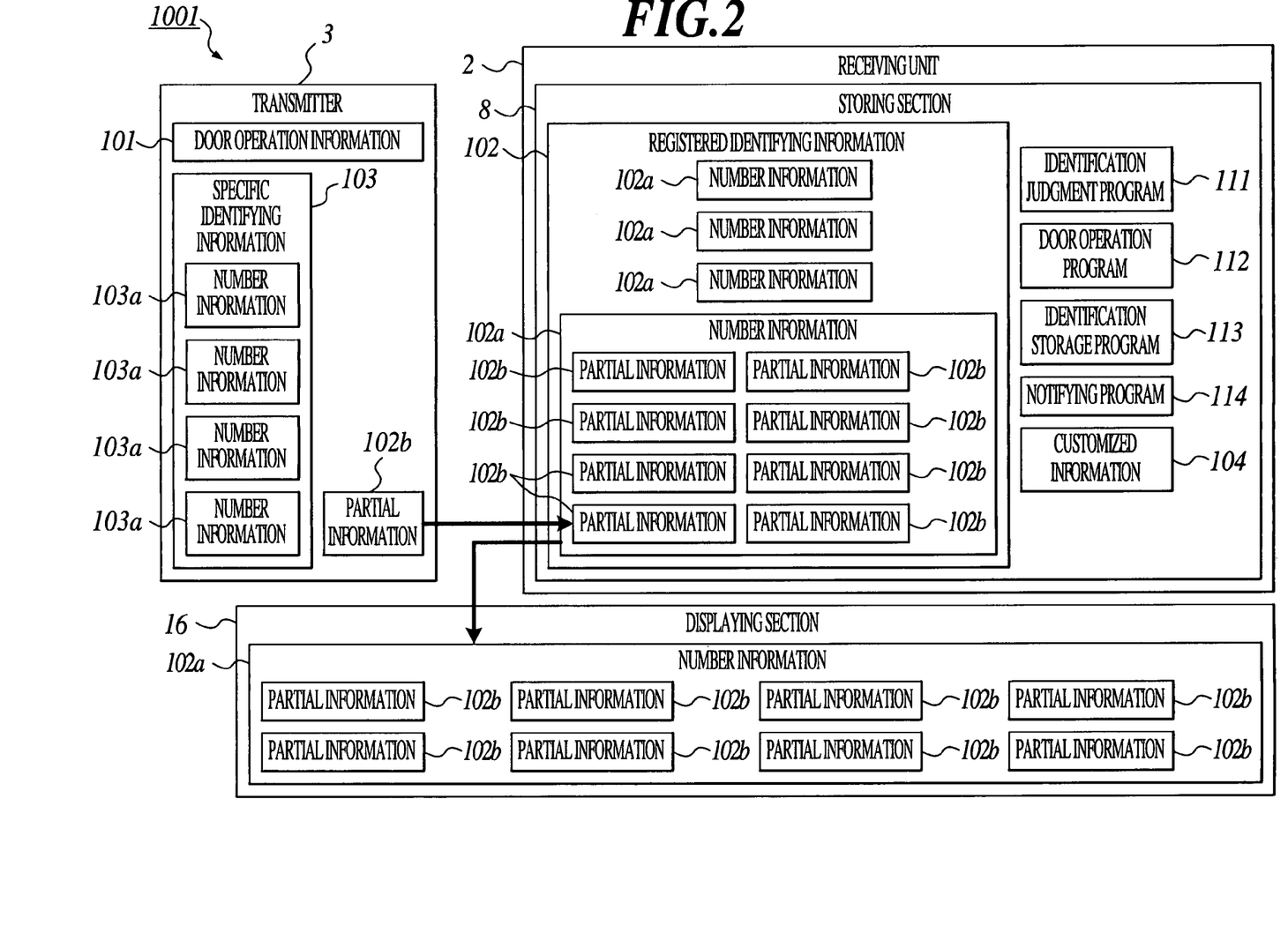
FIG. 2 is a functional explanatory diagram showing the keyless entry device in a state where a registered identifying information is registered, in the first embodiment of the present invention.
Figure 3A:
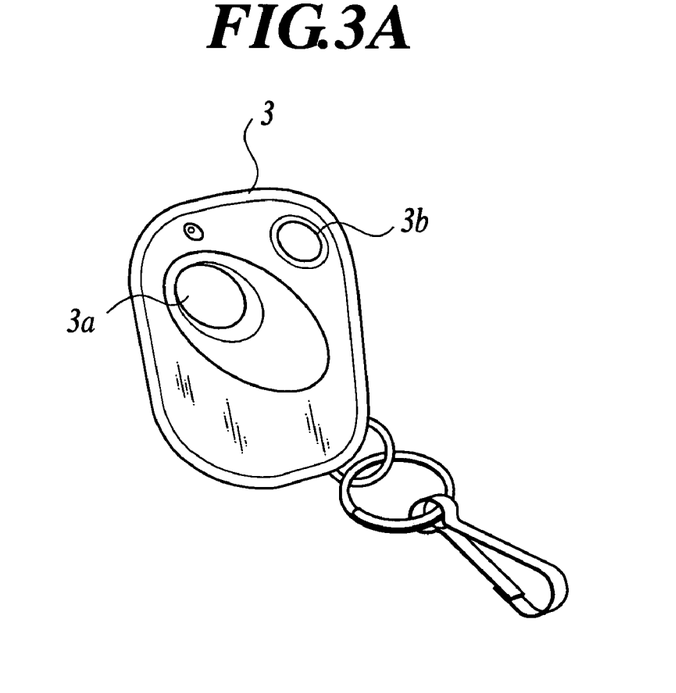
FIG. 3A is a front view showing a transmitter.
Figure 3B:
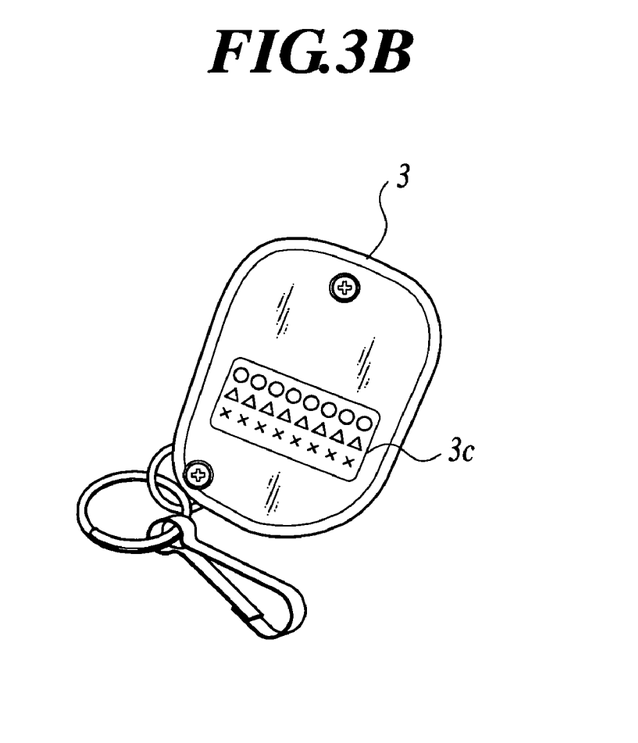
FIG. 3B is a rear view showing the transmitter.
Figure 4A:
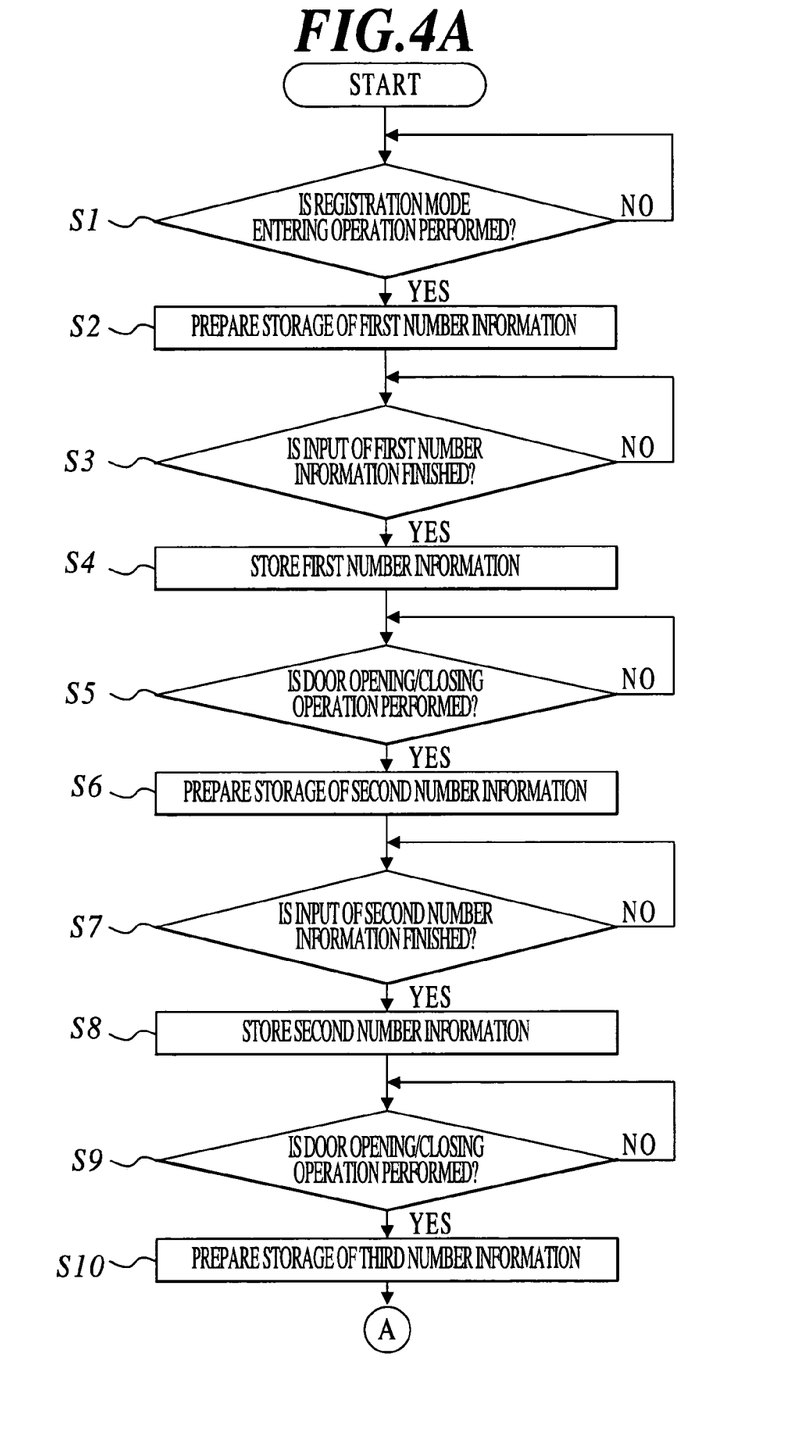
FIGS. 4A and 4B are flowcharts showing operations of a receiving unit when the registered identifying information is stored.
Figure 4B:
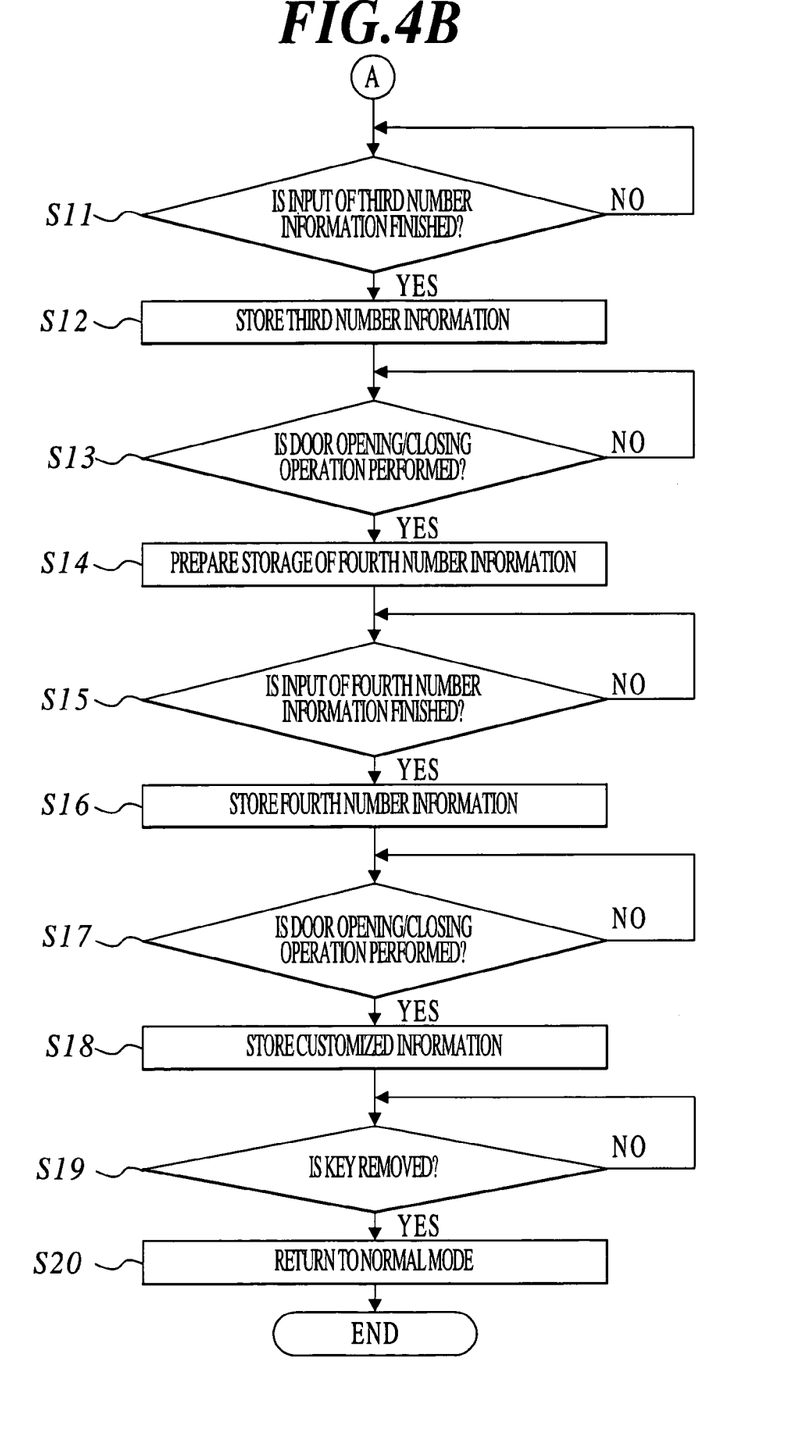

FIGS. 1 to 4B illustrate a first embodiment of the present invention, where FIG. 1 is a schematic structure block diagram of a keyless entry device, FIG. 2 is a functional explanatory diagram of the keyless entry device in a state where a registered identifying information is registered, FIGS. 3A and 3B are a front view and a rear view of a transmitter, and FIGS. 4A and 4B are flowcharts showing operations of a receiving unit when the registered identifying information is stored.

As shown in FIG. 1, a keyless entry device 1001 comprises a receiving unit 2 that is installed in a vehicle, and a transmitter 3 that a vehicle user carries. As shown in FIGS. 1 and 2, in the keyless entry device 1001, when the vehicle user presses a lock button 3a or unlock button 3b, which is used as an operating section relating to a door lock state on the transmitter 3, a door operation information 101 based on this operating state is transmitted. Thereafter, when the door operation information 101 is received by a receiving antenna 4 of the receiving unit 2, a control signal is outputted by a door lock control section 5 to drive a door lock device 6, whereby the vehicle doors are locked or unlocked. More specifically, at outside of the vehicle, the vehicle user can perform operations relating to the locking of the vehicle doors. Here, the receiving unit 2 may not have an integrated structure, where a receiving section 9, a calculating section 7, and controlling sections 5 and 12 are independently provided, or the receiving unit 2 may be partially integrated.

The receiving unit 2 comprises a calculating section 7 including, e.g., a CPU or the like, and a storing section 8 including, e.g., an EEPROM or the like. Further, the receiving unit 2 comprises a receiving section 9 connected to the receiving antenna 4, and an answerback control section 12 connected to an answer-back buzzer 10 and an answer-back lamp 11, in addition to the door lock control section 5 as described above. The answer-back buzzer 10 and the answer-back lamp 11 are the same as conventionally known ones.

In addition, the receiving unit 2 is electronically connected to an ignition switch 13, a door lock switch 14 and a door operating switch 15, as operating switches installed within the vehicle. Herein, the door lock switch 14 is arranged in an interior trim of the vehicle, and drives the door lock device 6 at a pressing operation by a crew or the like, to put the vehicle doors in a locked state. Further, the door operating switch 15 detects whether the vehicle doors are closed at a regular position.

Further, the receiving unit 2 is installed within the vehicle and connected to a displaying section 16 that displays a registered identifying information 102. In the first embodiment, the registered identifying information 102 includes a number information 102a relating to plural-digit number, and figures of each digit are displayed on the displaying section 16 when the registered identifying information 102 is stored. In the first embodiment, the registered identifying information 102 is a combination of four pieces of the number information 102a which comprises an eight-digit number. The figures of each digit in each number information 102a are treated as a partial information 102b which is obtained by dividing the registered identifying information 102 to each digit. For this displaying section 16, a monitor installed in the vehicle may be used, or the displaying section 16 may be connected to the receiving unit 2 only when the registered identifying information 102 is registered.

The receiving unit 2 is connected to a security system 17. More specifically, when the door operation information 101 is transmitted from the transmitter 3 to the receiving unit 2, the security system 17 is put under an armed state or a disarmed state, according to a necessity. Incidentally, the security system 17 has the same structure as that in a conventionally known one, and therefore, the description is omitted herein. Here, the security system 17 may be integrated with the receiving unit 2.

The transmitter 3 transmits a specific identifying information 103 along with the door operation information 101. The specific identifying information 103 is set so as to correspond to the above-described registered identifying information 102, and includes a number information 103a relating to a plural-digit number. As shown in FIG. 2, an identification judgment program 111 that judges whether this specific identifying information 103 coincides with the registered identifying information 102 is stored in a storing section 8 of the receiving unit 2. By this identification judgment program 111, when it is judged that the specific identifying information 103 coincides with the registered identifying information 102, the driving of the door lock control section 5 and the answerback control section 12 by a door operation program 112 is permitted. Here, the answerback control section 12 controls the answer-back buzzer 10 and the answer-back lamp 11 based on a customized information 104.

As shown in FIG. 3B, a code label 3c is attached to the transmitter 3. On this code label 3c, four pieces of the number information 103a in the specific identifying information 103 that is specific to the transmitter 3 are written. Here, this code label 3c may not be directly attached to the transmitter 3. More specifically, the number information 103a may be written, for example, on a key holder of the transmitter 3 or on a packing material of the transmitter 3.

In the storing section 8 of the receiving unit 2, an identification storage program 113 for storing the registered identifying information 102 based on the operating state of each of buttons 3a and 3b on the transmitter 3 is stored. The receiving unit 2 is so structured that when the predetermined registration permission signal is received, the storing of the registered identifying information 102 is permitted. In the first embodiment, this registration permission signal includes ON-signals for the ignition switch 13 or the like, so that by a registration mode entering operations including an operation where the registration operator turns a key inserted into a key cylinder and puts the ignition switch 13 under an ON-state, the receiving unit 2 can enter the registration mode and be put under a state where being capable of storing the registered identifying information 102. At the time of storing the registered identifying information 102, when the registration operator performs the pressing operation of each of the buttons 3a and 3b on the transmitter 3, figures of each digit in the each number information 102a are decided. In addition, the customized information 104 relating to the answerback of the door lock is also stored along with the registered identifying information 102.

In the first embodiment, the present device is so structured that when the lock button 3a as a figure varying button is pressed, a figure of each digit is increased and when the unlock button 3b as a figure deciding button is pressed, the figure of the digit is decided. Further, the present device is so structured that when each of the partial information 102b as much as one digit is sequentially received in the receiving unit 2, the registered identifying information 102 is stored in the receiving unit 2.

In the storing section 8, a reporting program 114 for reporting to the registration operator that reception of the partial information 102b in the receiving unit 2 is completed is stored. In the first embodiment, the program 114 reports to the registration operator the completion of the reception with the answer-back buzzer 10 and the answer-back lamp 11, and the calculating section 7, the storing section 8, the answer-back buzzer 10 and the answer-back lamp 11 are used as reporting means.

In the keyless entry device 1001 structured as described above, the operations of the receiving unit 2 in storing the registered identifying information 102 are described with reference to flowcharts in FIGS. 4A and 4B.

First, an operation of the ignition switch 13 for entering the registration mode or an opening/closing operation of the door at the driving seat or a combination of these operations is performed by the vehicle user, and it is determined whether the receiving unit 2 receives the predetermined registration permission signal from outside (Step S1). In the first embodiment, first, a driving seat door of the vehicle is operated to open/close by the registration operator for the reception of an output signal from the door operating switch 15, and then, the ignition switch 13 is operated so as to turn ON and OFF ten times within 15 seconds, whereby the receiving unit 2 receives the predetermined signal. Then, the receiving unit 2 blows the answer-back buzzer 10 and blinks the answer-back lamp 11 for notifying the registration operator of the completion of a preparation to enter the registration mode. In this state, when the driving seat door of the vehicle is further operated to open/close by the registration operator, the receiving unit 2 determines that all the operations for entering the registration mode are performed.

In Step S1, when it is determined that the operations for entering the registration mode are performed, the receiving unit 2 enters the registration mode and is put under the state where being capable of storing a registered identifying information 102 (Step S2). Incidentally, in Step 1, when it is determined that the operations for entering the registration mode are not performed, the receiving unit 2 returns to Step S1 to be ready for the operation.

In Step 2, after being put under the state where being capable of storing the registered identifying information 102, the receiving unit 2 determines whether the first number information 102a of the registered identifying information 102 is inputted by the operation of the door lock switch 14 (Step S3). In the first embodiment, the present device is so structured that the figure of each digit is increased according to a time period of pressing the lock button 3a. Concretely, when a predetermined time period passes since the start of the depression of the lock button 14, the answer-back buzzer 10 is intermittently blown and the answer-back lamp 11 blinks, so that the registration operator can distinguish figures according to the number of times of the answer-back buzzer 10 being blown and the number of times of the answer-back lamp 11 blinking.

By doing so, the figures are changed by the pressing operation of the lock button 3a, and the unlock button 3b is pressed to decide the figures of each digit. More specifically, when the operations of each of the buttons 3a and 3b are repeated eight times, all the eight figures of the number information 102a are decided. In the first embodiment, when the pressing operation of the unlock button 3b is detected, the receiving unit 2 notifies the registration operator that the figure of the digit is decided, by performing the blowing of the answer-back buzzer 10 and the blinking of the answer-back lamp 11 once, for a predetermined time period. Further, in the first embodiment, an eight-digit number which is being registered is to be displayed in real time on the displaying section 16, so that also in this way, the registration operator can distinguish the figures. Further, in the first embodiment, the registration operator can directly recognize the number information 102a to be registered, according to the code label 3c on the transmitter 3. When the transmitter 3 is not present in the vehicle, the number information 102a which is specific to the vehicle can be recognized and registered from the data or the like managed by the plant, the distribution outlet or the like.

In Step S3, when it is determined that the first number information 102a is inputted, this number information 102a is stored in the storing section 8 (Step S4). In the first embodiment, at this time, the answer-back buzzer 10 is blown twice and the answer-back lamp 11 blinks twice. By doing so, the registration operator can recognize that the first number information 102a is stored. The blowing time period and the lighting time period are set to be longer than those at the operation input by the lock button 3a. In Step S3, when it is determined that the first number information 102a is not inputted, the receiving unit 2 returns to Step S3 to be ready for the input.

Thereafter, it is determined whether an opening/closing operation of the vehicle doors is performed (Step S5), and when it is determined that the opening/closing operation is performed, the receiving unit 2 is put under the state where being capable of storing the second number information 102a (Step S6). When the opening/closing operation of the vehicle doors is not performed, the receiving unit 2 returns to Step S5 to be ready for the operation. After Step S6, the receiving unit 2 determines whether the second number information 102a of the registered identifying information 102 is inputted by the operation of each of the buttons 3a and 3b on the transmitter 3 (Step S7). Here, the operations of the receiving unit 2 when the second number information 102a is stored in the storing section 8 are the same as those in inputting the first number information 102a, and therefore, the description is omitted herein.

In Step S7, when it is determined that the second number information 102a is inputted, this number information 102a is stored in the storing section 8 (Step S8). Also on this occasion, by using the answer-back buzzer 10 and the answer-back lamp 11, the registration operator is notified that the number information 102a is stored.

Then, it is determined again whether the opening/closing operation of the vehicle doors is performed (Step S9). Thus, third and fourth number informations 102a also are stored by the same operation as that of the first and second number informations 102a (Step S10 to Step S17).

After the first to fourth number informations 102a are registered, the customized information 104 is continuously stored (Step S18). In the first embodiment, a pattern of the answerback can be selected among several kinds of patterns by using the door lock switch 14.

Thereafter, it is determined whether a key is pulled out from a key cylinder (Step S19). When it is determined that the key is pulled out from the key cylinder, the receiving unit 2 returns from the registration mode to the normal mode (Step S20). In the first embodiment, when the receiving unit 2 returns to the normal mode, the answer-back buzzer 10 is blown three times and the answer-back lamp 11 blinks three times. The blowing time and the lighting time are the same as those in storing each of the number information 102a.

As described above, according to the keyless entry device 1001 of the first embodiment, when the registered identifying information 102 is stored in the receiving unit 2, the registered identifying information 102 is not at once stored by the receiving unit 2, but a plurality of pieces of the divided partial information 102b are sequentially received by the receiving unit 2. Thereby, the whole registered identifying information 102 is stored in the receiving unit 2.

Accordingly, even if the registered identifying information 102 is transmitted to the receiving unit 2 by the third person intending the theft, the registered identifying information 102 is prevented from being written over because the receiving unit 2 is set so as to sequentially perform the reception of divided partial informations 102b. Therefore, the device can be remarkably improved in the security as compared with the conventional one where the registration of the identifying information is performed by the transmitter 3, without a special protective function provided.

Further, according to the keyless entry device 1001 of the first embodiment, the specific identifying information 103 and the registered identifying information 102 are the number informations 103a and 102a, respectively, and therefore, not only is management of information conveniently performed but also the partial information 102b can be easily produced by dividing a plural-digit number into the predetermined digit number.

According to the keyless entry device 1001 of the first embodiment, whenever the reception of the partial information 102b in the receiving unit 2 is completed, the answer-back buzzer 10 and the answer-back lamp 11 notify the registration operator that the reception is completed. Accordingly, the registration operator can recognize whether the input of the next partial information 102b should be performed according to the completion of input of a piece of the partial information 102b with no problems, or the re-input has to be performed due to the incompletion of input of a piece of the partial information 102b by, for example, communication failure or inputting error.

According to the keyless entry device 1001 of the first embodiment, since the displaying section 16 is installed, when the registered identifying information 102 is stored, the registration operator can perform the registration operation while having the number information 102a of the registered identifying information 102 with looking at the displaying section 16. Therefore, the burden on the registration operator is reduced, and the correct registered identifying information 102 can be accurately registered.

Further, according to the keyless entry device 1001 of the first embodiment, when the respective buttons 3a and 3b on the transmitter 3 are operated as many times as the number of the digits in the number information 102a in the registered identifying information 102, namely, by eight times, all the figures of each digit in the registered identifying information 102 are fixed and thereby, each of the number information 102a of the registered identifying information 102 is decided. By doing so, the registration operation can be elaborated requires complicated processing and as the result, the registered identifying information 102 of the receiving unit 2 cannot be easily written over. Accordingly, also in this way, writing-over of the registered identifying information 102 by the third person intending the theft can be prevented.

Further, according to the keyless entry device 1001 of the first embodiment, figures in each digit are decided according to a time period of holding on the lock button 3a and therefore, the complicated registration operation is not required and as the result, the registration operator can perform the registration without having any troubles with an input operation.

Further, according to the keyless entry device 1001 of the first embodiment, the lock button 3a is used for changing figures and the unlock button 3b is used for deciding the figures, whereby the respective buttons 3a and 3b provided on the transmitter 3 can be effectively used. In addition, since the input operation of the number information 102a is relatively simple, the burden on the registration operator can be further reduced.

Further, according to the keyless entry device 1001 of the first embodiment, until a predetermined registration permission signal is received, the registered identifying information 102 cannot be stored. Accordingly, by separately setting this registration permission signal for each vehicle, the security is further improved. Further, for example, the predetermined registration permission signal may be transmitted from an immobilizer apparatus, or the predetermined registration permission signal may be transmitted when a specific password of a vehicle user is inputted from a failure diagnosing device, etc.

Further, according to the keyless entry device 1001 of the first embodiment, when the registered identifying information 102 is stored in the receiving unit 2, the customized information 104 relating to the answerback of the door lock is stored along with the registered identifying information 102. Accordingly, the setting of the answerback function of the door lock can be performed with that of the registered identifying information at the same time, that is, these settings can be performed at once. Therefore, it is extremely convenient.

Further, according to the keyless entry device 1001 of the first embodiment, even if the transmitter 3 for the registration in the receiving unit 2 is not on hand, the registered identifying information 102 can be stored in the receiving unit 2 by receiving the information 102 in the receiving unit 2 with another transmitter 3.

In the first embodiment, described is the case that the figure of the number information 102a is increased in response to the time period of holding on the door lock switch 14 as an operating switch. However, the present device may be so structured that the figures of each digit in each number information 102a are decided by the number of the times of the depression of the door lock switch 14. Also in this case, the complicated registration operation is not required and as the result, the registration operator can perform the registration without having trouble with any input operations.

Further, in the first embodiment, described is the case that the number information 102a is included as the information 102. However, the number information 102a may not be included. Further, described is the case that the partial information 102b is a one-digit figure. However, the partial information 102b may be at least a single-digit number. That is, the partial information 102b may be the number comprising the plural digits. Further, when the plurality of the pieces of the information 102 have the plurality of the pieces of the number information 102a as in the first embodiment, each of the number information 102a may be treated as the partial information 102b.

Further, in the first embodiment, described is the case that the customized information 104 is stored along with the information 102. However, the customized information 104 may be stored in the storing section 8 separately from the information 102. Further, of course, the answerback function may not be stored.

Further, in the first embodiment, described is the case that the number information 102a is displayed on the displaying section 16. However, the present device may be of course so structured that the displaying section 16 is not installed. In this case, the registration operator recognizes figures by the answer-back buzzer 10 and the answer-back lamp 11.

Further, in the first embodiment, described is the case that when the lock button 3a on the transmitter 3 is pressed, the figures of each digit in the number information 102a are increased, and when the unlock button 3b is pressed, the figures of each digit are decided. However, the present device may be of course so structured that the figures are increased by the unlock button 3b and figures are decided by the lock button 3a. That is, the present device may be so structured that when any one of the respective buttons 3a and 3b is pressed, the figures are increased, and when another button is pressed, the figures are decided.

Further, in the first embodiment, described is the case that the registration operation of the information 102 is performed with the respective buttons 3a and 3b on the transmitter 3. However, the registration operation of the information 102 may be performed with an operating switch installed within the vehicle or the failure diagnosing device provided independently from the vehicle, which the diagnoses failures of the receiving unit 2, and in addition, a concrete detailed structure or the like can be appropriately changed as needed.

Further, in the first embodiment, described is the case that the receiving unit 2 enters the registration mode by operations of the ignition switch 13 or the like. Further, the transmitter 3 may also enter the registration mode. More specifically, when the registration mode entering function is imparted also to the transmitter 3 to permit the information 102 to be stored in the receiving unit 2 using the regular transmitter 3 corresponding to the receiving unit 2, in particular, the efficiency in the registration work of the operator can be promoted.

Herein, for example, the present device is preferably so structured that, when the device enters the registration mode, the transmitter 3 is permitted to have a function of determining whether the figures of each digit in the information 102 decided through the operation of the operator coincide with the figures stored in the transmitter 3, whereby the operator designates the figures of each digit, for example, by performing the pressing operation of the lock button 3a on the transmitter 3. At this time, the transmitter 3 compares the information 102 that the transmitter 3 holds in itself, with the figures inputted by the operator, and if the figures coincide with each other, the transmitter 3 notifies the operator of the result by lighting the indicator of the transmitter 3. Therefore, the operator may perform the input of the information 102 while confirming a display of the indicator, and therefore, this device is extremely efficient. Herein, the transmitter 3 may notify the operator of the comparison result not by the lighting of the indicator but by the blowing of the buzzer.

As a method for making the transmitter 3 and the receiving unit 2 enter the registration mode as described above, the method for individually making them enter the registration mode through a special operation with the operating switch (the ignition switch 13, the door lock switch 14 and the door operating switch 15) installed within the vehicle or with the lock button 3 and the unlock button 3b on the transmitter 3 may be applied to each of the transmitter 3 and the receiving unit 2, in the same manner as in the first embodiment.

Further, when the keyless entry device 1001 can transmit and receive the information mutually, for example, as well as a smart entry device, the receiving unit 2 enters the registration mode, whereby the transmitter 3 side may be notified that the receiving unit 2 is put under the registration mode, and the transmitter 3 side also may enters the registration mode at the same time. At this time, as a matter of course, the receiving unit 2 may enter the registration mode first. By doing so, the receiving unit 2 and the transmitter 3 can surely and simply enter the registration mode.

Further, by carrying out a special operation for entering the registration mode with the transmitter 3 in which the registration of the information 102 in the receiving unit 2 is completed, the transmitter 3 and the receiving unit 2 may enter the registration mode when it is determined that an instruction is given by a valid operator. By doing so, the transmitter 3 and the receiving unit 2 can surely and smoothly enter the registration mode.

SECOND EMBODIMENT

In the above-described first embodiment, described is the method that the identification (number) of the transmitter, which is shown on the transmitter with a label or the like is registered as many as one digit through the plurality of times of operations of the switches on the transmitter. In a second embodiment, what will be described is the method with which the identification of the transmitter, which is shown on the transmitter, is registered on the receiver side by the plurality of the times of the operations of the existing switches within the vehicle.

The schematic structure of the keyless entry device in the second embodiment is almost the same as that of the keyless entry device 1001 shown in FIG. 1 in the first embodiment, excluding the storing section of the receiving unit and the transmitter. Further, the operations of the transmitter and the receiving unit at the time of storing the registered identifying information in the second embodiment are the same as those shown in FIGS. 3A and 3B, and FIGS. 4A and 4B in the first embodiment, respectively, excluding a part of the operations. Accordingly, the description of the same portion is omitted, and only a different operation from that of the first embodiment will be described below.

Figure 5:
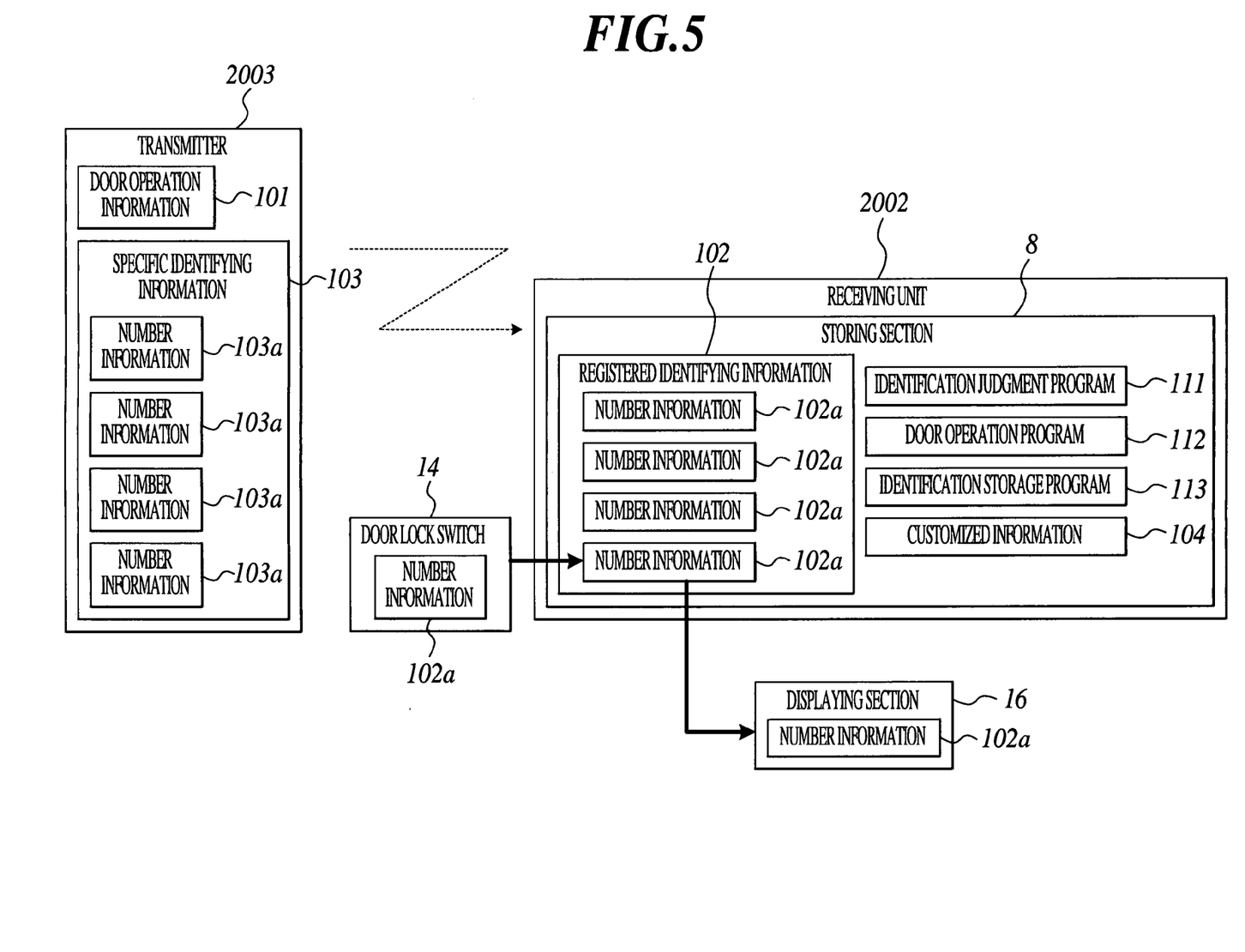
FIG. 5 is a functional explanatory diagram showing a keyless entry device in a state where the registered identifying information is registered, in the second embodiment of the present invention.

FIG. 5 is a functional explanatory diagram of the keyless entry device in a state in which the registered identifying information is registered, in the second embodiment of the present invention.

In the second embodiment, installed switches in the vehicle are used as the operating switch. Here, the operating switch is not limited to these switches, and may be, for example, an air conditioner switch or an audio switch installed on the instrument panel within the vehicle.

The receiving unit 2002 is installed within the vehicle and is connected to the displaying section 16 that displays the information 102. In the second embodiment, the information 102 includes the number information 102a relating to plural-digit number, and the figures of each digit are displayed on the displaying section 16 at the time of storing information 102. In the second embodiment, the information 102 is a combination of four pieces of the number information 102a including the eight-digit number. As this displaying section 16, a monitor installed in the vehicle may be used, or the section 16 may be one being connected to the receiving unit 2002 only at the time of registering the information 102.

In the storing section 8 of the receiving unit 2002, the identification storage program 113 for storing the information 102 based on the operating state of the door lock switch 14 is stored. The receiving unit 2002 is so structured that when the predetermined registration permission signal is inputted, the storing of the information 102 is permitted. In the second embodiment, this registration permission signal includes the on/off signals for the ignition switch 13 or the like, and when the registration operator turns the key which is inserted into the key cylinder to perform the predetermined operations relating to the ON/OFF of the ignition switch 13, the receiving unit 2002 can enter the registration mode and put under the state where being capable of storing the information 102. At the time of storing the information 102, when the registration operator performs the pressing operation of the door lock switch 14, the figures of each digit in each number information 102a are decided. In the second embodiment, the present device is so structured that the figures of each digit in the number information 102a are decided according to the time period of holding on the door lock switch 14. In addition, the user customized information 104 such as an answer-back function of the door lock such as a lighting time of a room lamp is also stored along with the information 102.

Subsequently, in the keyless entry device in the second embodiment, with respect to the operations of the receiving unit 2002 at the time of storing the information 102, an operation being different from that of the first embodiment will be described with reference to flowcharts of FIGS. 4A and 4B.

In the second embodiment, for the input of the number information, the figures of each digit are decided according to the time period of holding on the door lock switch 14. Concretely, when the predetermined time passes since the start of holding on the door lock switch 14, the answer-back buzzer 10 is intermittently blown and the answer-back lamp 11 blinks, so that the registration operator can distinguish the figure according to the number of the times of the blowing of the answer-back buzzer 10 and the number of the times of the blinking of the answer-back lamp 11. Further, in the second embodiment, the eight-digit number which is being registered is displayed in a real time on the displaying section 16, so that also in this way, the registration operator can distinguish a the figure.

In the second embodiment, the registration operator can directly recognize the number information 102a to be registered, by the code label 3c on the transmitter 2003.

When the transmitter 2003 is not available in the vehicle, the number information 102a being peculiar to the vehicle can be recognized and registered from data or the like managed by the plants or the distribution outlets.

In Step S3, when it is determined that the first number information 102a is inputted, this number information 102a is stored in the storing section 8 (Step S4). In the second embodiment, at this time, the answer-back buzzer 10 is blown twice and the answer-back lamp 11 blinks twice. By doing this, the registration operator can recognize that the first number information 102a is stored. The blowing time and the blinking time are set longer than those at the operation input with the door lock switch 14. In Step S3, when it is determined that the first number information 102a is not inputted, the receiving unit 2002 returns to Step S3 to be ready for the input.

Thereafter, it is determined whether the opening/closing operation of the vehicle doors is performed (Step S5), and when it is determined that the opening/closing operation is performed, the second number information 102a is put under the state being capable of storing (Step S6). When the opening/closing operation of the vehicle doors is not performed, the receiving unit 2002 returns to Step S5 to be ready for the operation. After Step S6, it is determined whether the second number information 102a of the information 102 is inputted by the operation of the door lock switch 14 (Step S7). The operations of the receiving unit 2002 for storing the second, third and fourth number informations 102a in the storing section 8 are the same as those of inputting the first number information 102a, and the operations for storing the customized information and for returning to the normal mode are the same as those of the first embodiment and therefore, the description is omitted herein.

As described above, according to the keyless entry device of the second embodiment, when the information 102 is stored in the receiving unit 2002, the ignition switch 13, the door lock switch 14 and the door operating switch 15 each of which is installed within the vehicle are used. More specifically, the registration operator directly gets on the vehicle and operates the respective switches 13, 14 and 15 within the vehicle so that the predetermined information 102 is stored in the receiving unit 2002.

Accordingly, since the respective switches 13, 14 and 15 have to be directly used at the registration, the information 102 is not written over by the third person intending the theft. As the result, the device is remarkably improved in the security in comparison with the conventional one in which the registration of the identifying information 102 is performed with the transmitter 2003 without the special protective function provided.

Further, in the vehicle plants, the vehicle distribution outlets or the like, the registration of the identifying information can be performed without using the transmitter 2003 and therefore, the device is extremely convenient. Further, since the person who registers the identifying information can be identified, the device is convenient also in view of the management of the identifying information.

According to the keyless entry device of the second embodiment, when the door lock switch 14 is operated as many times as the number of the digits in the number information 102*a* of the information 102, namely, by eight times, all the figures of each digit in the information 102 are fixed and thereby, the each number information 102*a* of the information 102 is decided. By doing so, the registration operation requires complicated processing and as a result, the information 102 in the receiving unit 2002 cannot be easily written over. Accordingly, also in this way, the writing-over of the information 102 by the third person intending the theft can be prevented.

Further, according to the keyless entry device of the second embodiment, the figures of each digit are decided according to the time period of holding on the door lock switch 14 and therefore, the complicated registration operation is not required and as the result, the registration operator can perform the registration without having any troubles with the input operation.

Further, according to the keyless entry device of the second embodiment, until the predetermined registration permission signal is inputted, the information 102 cannot be stored. Therefore, this registration permission signal is separately set for each vehicle, whereby the security is further improved. Further, the registration may be permitted, for example, when the predetermined registration permission signal is inputted from an immobilizer apparatus, or when a specific password of a vehicle user is inputted from a failure diagnosing device.

Further, according to the keyless entry device of the second embodiment, the displaying section 16 is installed and therefore, when the information 102 is stored, the registration operator can perform the registration operation while having the number information 102*a* of the information 102 within his/her sight by using the displaying section 16. Therefore, a burden on the registration operator can be reduced, and the correct information 102 can be accurately registered.

According to the keyless entry device of the second embodiment, when the information 102 is stored in the receiving unit 2002, the customized information 104 relating to the answerback of the door lock is stored along with the information 102, so that the setting of user's customized information 104 such as the answerback function of the door lock and the lighting time of the room lamp also can be performed simultaneously with that of the information 102, that is, these settings can be performed at once and therefore, the device is extremely convenient.

In the second embodiment, described is the case that the figures of the number information 102*a* are increased in response to the time period of holding on the door lock switch 14 as the operating switch. However, the present device may be so structured that the figures in each digit of each number information 102*a* are designated on the basis of the number of the times of the depression, the angle of rotation or the number of the times of the repeating operations of the door lock switch 14 or of the operating switch other than the door lock switch 14 of the vehicle, and the figures of each digit in the each number information 102*a* are decided by an operating switch being different from the operating switch that has designated the figures in each digit. That is, the operating switch may include a digital figure designating switch that designates the figures of each digit in the number information 102*a* and a digital figure deciding switch that decides the figures of each digit designated by this digital figure designating switch. In this case, by an operation of designating the figures of each digit with the digital figure designating switch and in addition to this operation, by a figure separating operation with the digital figure deciding switch, the figures of each digit are decided and therefore, the complicated registration operation is not required and as the result, the registration operator can perform the registration more easily without having any troubles with the input operation.

Further, in the second embodiment, described is the case that the number information 102*a* is included as the information 102. However, the number information 102*a* may not be included.

Further, in the second embodiment, described is the case that the customized information 104 is stored along with the information 102. However, the customized information 104 may be stored in the storing section 8 separately from the information 102. Further, of course, the answer-back function may not be stored.

Further, in the second embodiment, described is the case that the number information 102*a* is displayed on the displaying section 16. However, the present device may be of course so structured that the displaying section 16 is not installed. In this case, the registration operator recognizes the figures by the answer-back buzzer 10 and the answer-back lamp 11.

Further, in the second embodiment, the device is so structured that when the receiving unit enters the registration mode, the door lock control section 5 stops the output of the control signals to the door lock device 6, and when the receiving unit leaves from the registration mode, the control section 5 resumes the output. Concretely, when the registration mode entering operation is performed in Step S1, the output of the control signal is stopped, and when the returning to the normal mode is performed in Step S20, the output of the control signal is resumed. As the result, the door lock device 6 does not interlock with the pressing operation of the door lock switch 14, so that the door lock device can be prevented from performing a lock or unlock operation in response to the pressing operation.

THIRD EMBODIMENT

Figure 6:
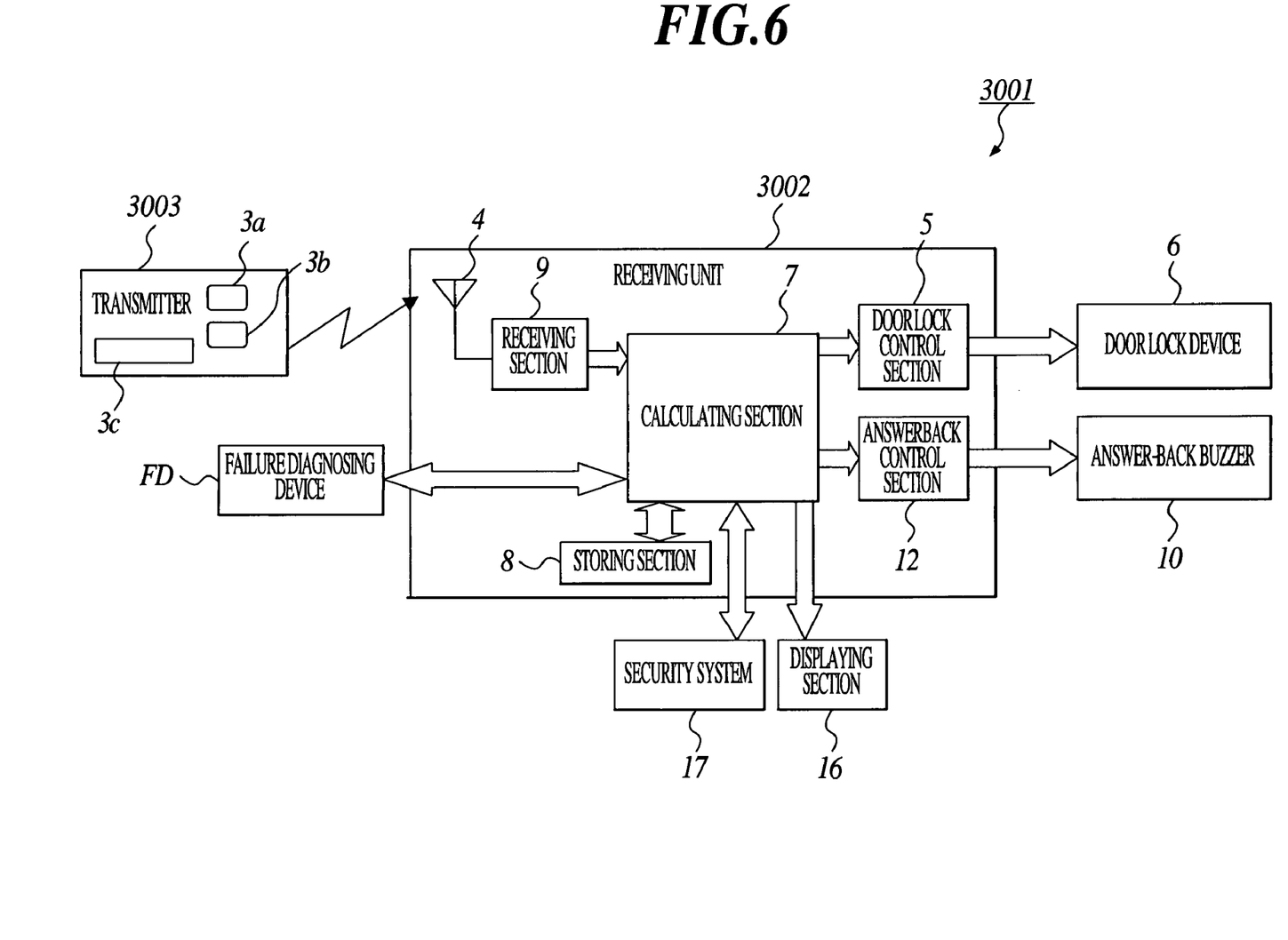
FIG. 6 is a schematic structure block diagram showing the keyless entry device in a third embodiment of the present invention.

FIG. 6 is the schematic structure block diagram of the keyless entry device 3001 showing a third embodiment of the present invention. The third embodiment differs from the second embodiment in that the registered identifying information is stored not with the operating switch such as an ignition switch, a door lock switch and a door operating switch but with the failure diagnosing device. The third embodiment will described hereafter.

As shown in FIG. 6, this keyless entry device 3001 is not connected to the operating switch of the vehicle, and is structured so as to be connected to the failure diagnosing device FD which is provided separately from the vehicle. This failure diagnosing device FD is a conventionally known one for use in the manufacturing plant of the vehicles or the maintenance shop of the distribution outlets. The failure diagnosing device has the keyboard and the monitor, and performs the detection of a power line of the vehicles in addition to the receiving unit 3002.

In the third embodiment, the identification storage program 113 in the storing section 8 of the receiving unit 3002 permits the storing section 8 to store the registered identifying information 102 based on a registered identification signal 211 transmitted from the failure diagnosing device FD. In the third embodiment, the figures of the number information 102a can be inputted from the keyboard of the failure diagnosing device FD, and the number information 102a during the registration is displayed on the monitor.

As described above, according to the keyless entry device 3001 of the third embodiment, the registered identifying information 102 can be stored in the receiving unit 3002 from the failure diagnosing device FD provided separately from the vehicle. More specifically, in the vehicle plants, the vehicle distribution outlets or the like, when the failure diagnosing device FD is connected to the vehicle, the registered identifying information 102 can be stored with this failure diagnosing device.

Accordingly, the failure diagnosing device FD has to be used on the occasion of the registration and therefore, the information 102 is not written over by the third person intending the theft. As the result, the device is remarkably improved in the security as compared with the conventional one in which the registration of the identifying information is performed with the transmitter without the special protective function provided.

Further, in the vehicle plants, the vehicle distribution outlets or the like, the registration of the identifying information can be performed without using the transmitter and therefore, the device is extremely convenient. Further, since the person who registers the identifying information can be identified, the device is convenient in view of the management of the identifying information.

In addition, the description of the effect which is similar to that of the second embodiment is omitted.

In the third embodiment, the present device is so structured that the operating switch or the like, as the first and second embodiments are omitted. However, the present device may be so structured that the operating switch is provided to be connectable to the failure diagnosing device FD. In this case, the number information 102a can be selectively registered by the operating switch and the failure diagnosing device FD and therefore, versatility of the registration operation is drastically improved.

Further, in the third embodiment, since the number information 102a which is being registered is displayed on the monitor of the failure diagnosing device FD, a particular problem is not caused even if the displaying section 16 is not installed and as a matter of course, other concrete detailed structure or the like can also be suitably changed.

What is claimed is:

1. A keyless entry device comprising:
a transmitter with an operating section relating to a door lock state for transmitting a door operation information and a specific identifying information based on an operating state of the operating section;
a receiving unit for outputting a signal to a door lock device based on transmitted door operation information when the specific identifying information transmitted coincides with registered identifying information stored previously; and
an operating switch installed in a vehicle and connected to the receiving unit;
wherein the registered identifying information is stored in the receiving unit based on an operating state of the operating switch, and
wherein the operating switch is installed in the vehicle for operating a door to enter a locked state or an unlocked state, and when the registered identifying information is stored by an operation on the operating switch, an output of a control signal for controlling the door lock device to enter the locked state or the unlocked state in conjunction with the operating switch is stopped.

2. The keyless entry device according to claim 1, wherein each of the specific identifying information and the registered identifying information includes a number information relating to a number comprising a plurality of digits, and by operating the operating switch with respect to each digit of the number, the registered identifying information to be stored in the receiving unit is decided.

3. The keyless entry device according to claim 2, wherein the operating switch uses a button system and a figure of each digit of the number information is decided on the basis of a number of times of pressing the operating switch.

4. The keyless entry device according to claim 2, wherein the operating switch uses a button system and a figure of each digit of the number information is decided on the basis of a time period of holding on the operating switch.

5. The keyless entry device according to claim 2, wherein the operating switch comprises a digital figure designating switch for designating a figure of each digit of the number information and a digital figure deciding switch for deciding the figure designated by the digital figure designating switch.

6. The keyless entry device according to claim 2, further comprising a reporting section for reporting that a reception of the each digit of the number by the receiving unit is completed.

7. The keyless entry device according to claim 6, wherein said reporting section is an answerback buzzer.

8. The keyless entry device according to claim 6, wherein said reporting section is an answerback lamp.

9. The keyless entry device according to claim 8, wherein said answerback lamp is a room lamp of the vehicle.

10. The keyless entry device according to claim 1, wherein the registered identifying information is stored in the receiving unit based on the operating state of the operating switch and based on a registered identification signal transmitted from a failure diagnosing device provided separately of the vehicle and diagnoses failures of the receiving unit.

11. The keyless entry device according to claim 1, wherein the receiving unit is so structured that storing the registered identifying information is permitted when a predetermined registration permission signal is inputted.

12. The keyless entry device according to claim 1, further comprising a displaying section for displaying the number information when the registered identifying information is stored in the receiving unit.

13. The keyless entry device according to claim 1, wherein when the registered identifying information is stored in the receiving unit, a customized information is stored along with the registered identifying information.

14. The keyless entry device according to claim 13, wherein said customized information is an information of an answerback function of a door lock.

15. The keyless entry device according to claim 14, wherein said customized information is an answerback pattern number to specify an answerback pattern among several kinds of answerback patterns.

16. The keyless entry device according to claim 14, wherein said customized information is an information to operate an answerback buzzer.

17. The keyless entry device according to claim 14, wherein said customized information is an information to operate an answerback lamp.

18. The keyless entry device according to claim 17, wherein said answerback lamp is a room lamp of the vehicle.

19. The keyless entry device according to claim 1, wherein;
   said specific identifying information includes a number information relating to a number comprising a plurality of digits.

20. The keyless entry device according to claim 1, wherein;
   said registered identifying information includes a number information relating to a number comprising a plurality of digits.

* * * * *